United States Patent
Sar et al.

(10) Patent No.: US 9,684,627 B1
(45) Date of Patent: Jun. 20, 2017

(54) DETERMINING A LIKELIHOOD OF COMPLETION OF A TASK

(71) Applicant: Google Inc., Mountain View, CA (US)

(72) Inventors: Erwin Can Sar, Mountain View, CA (US); Timothy Youngjin Sohn, Mountain View, CA (US); Andrew Tomkins, Menlo Park, CA (US); Vijay Umapathy, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 14/106,160

(22) Filed: Dec. 13, 2013

(51) Int. Cl.
*G06Q 10/00* (2012.01)
*G06F 15/00* (2006.01)

(52) U.S. Cl.
CPC .................................. *G06F 15/00* (2013.01)

(58) Field of Classification Search
CPC ......... G06Q 10/00; G06Q 40/06; G06Q 17/60
USPC ....................................................... 705/7.31
See application file for complete search history.

(56) References Cited

U.S. PATENT DOCUMENTS

| 5,603,054 | A | 2/1997 | Theimer et al. |
| 6,842,877 | B2 | 1/2005 | Robarts et al. |
| 7,027,997 | B1 * | 4/2006 | Robinson ......... G06Q 10/06311 705/7.13 |
| 7,496,500 | B2 | 2/2009 | Reed et al. |
| 8,055,707 | B2 | 11/2011 | Desai et al. |
| 8,108,206 | B2 | 1/2012 | Hufnagel et al. |
| 8,306,840 | B2 * | 11/2012 | Cohen .................... G06Q 10/06 705/7.21 |
| 8,364,467 | B1 | 1/2013 | Bowman et al. |
| 8,375,099 | B2 | 2/2013 | Carroll et al. |
| 8,417,650 | B2 | 4/2013 | Graepel et al. |
| 8,521,818 | B2 | 8/2013 | McGann et al. |
| 8,560,487 | B2 | 10/2013 | Jhoney et al. |
| 8,599,801 | B2 | 12/2013 | Baio et al. |
| 8,972,276 | B2 * | 3/2015 | Storzum ......... G06Q 10/06398 705/7.12 |
| 9,378,456 | B2 * | 6/2016 | White ................... G06F 9/4856 |
| 2006/0106774 | A1 * | 5/2006 | Cohen .................... G06Q 30/06 |
| 2008/0256454 | A1 | 10/2008 | Latzina et al. |
| 2009/0113432 | A1 * | 4/2009 | Singh .................... G06F 9/4881 718/102 |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Romain Jeanty
(74) *Attorney, Agent, or Firm* — Middleton Reutlinger

(57) ABSTRACT

Methods and apparatus related to determining a likelihood that a task is completed. One or more task completion entities with which the user can interact to complete the task may be determined. One or more activity data indicators may be determined for a given entity of the task completion entities. The activity data indictors are indicative of the user performing the action through interaction with the given entity. User activity data may be received and compared with the activity data indicators to determine one or more matching activity data indicators of the activity data indicators that match the user activity data. A likelihood that the task is completed may be determined based on the matching activity data indicators.

19 Claims, 5 Drawing Sheets

(56) References Cited

U.S. PATENT DOCUMENTS

| | | |
|---|---|---|
| 2009/0307212 A1 | 12/2009 | Ramot et al. |
| 2010/0185474 A1* | 7/2010 | Frank ............. G06Q 10/063114 |
| | | 705/7.15 |
| 2012/0150532 A1 | 6/2012 | Mirowski et al. |
| 2012/0239761 A1 | 9/2012 | Linner et al. |
| 2012/0242584 A1 | 9/2012 | Tuli |
| 2012/0317499 A1 | 12/2012 | Shen |
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0297551 A1 | 11/2013 | Smith et al. |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

* cited by examiner

| Task Entry | Task Completion Entities | Activity Data Indicators |
|---|---|---|
| <Task Action = "contact", Task Object = "mom"> | Mom | 555-555-5555; |
| | | 444-444-4444; |
| | | mom@example.com; |
| | | mom's social network identification |
| <Task Action = "get", Task Object = "groceries"> | Brick and Mortar grocery Store # 1; | Location Information |
| | | Aliases |
| | | Application Information |
| | | Web-based Documents |
| | | Wireless Network Information |
| | Grocery Delivery Service # 1. | Aliases |
| | | Application Information |
| | | Web-based Documents |
| | | E-mail Confirmation Information |

FIG. 2

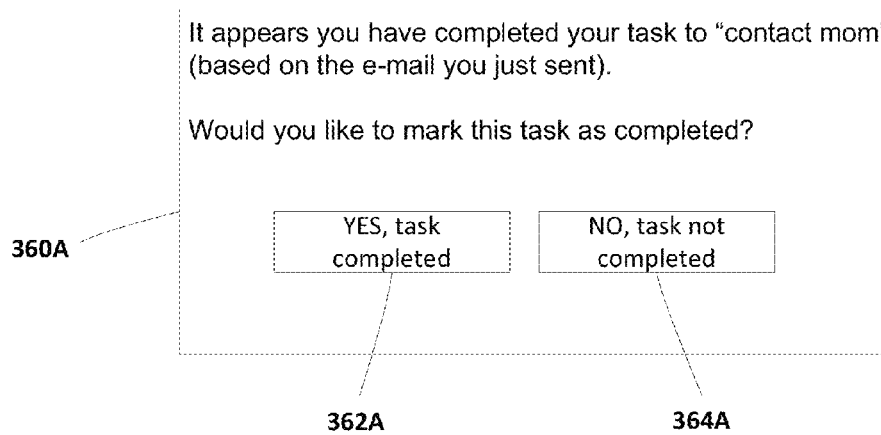
FIG. 3A
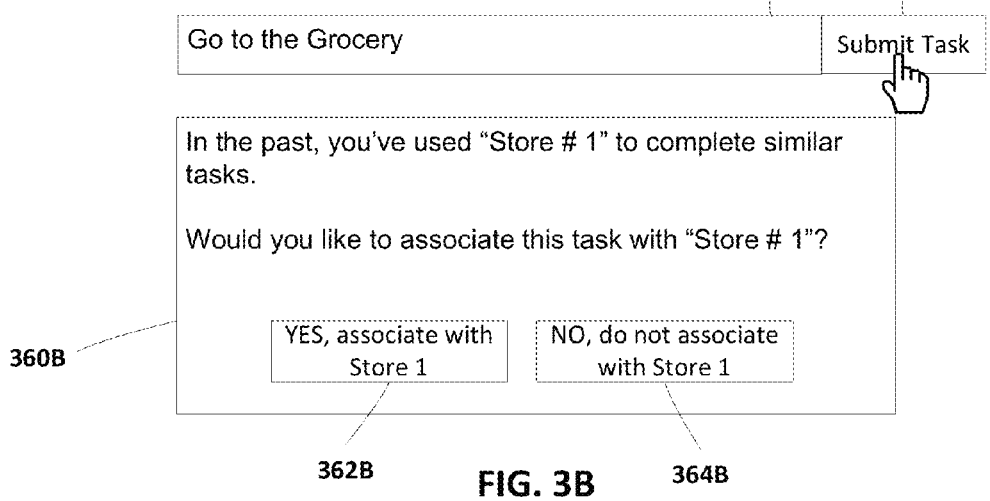
FIG. 3B
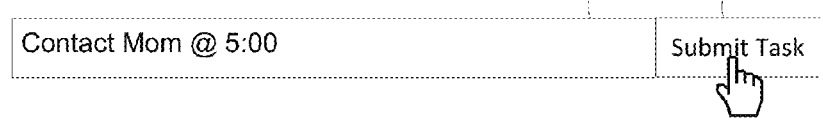
FIG. 3C1
FIG. 3C2

DETERMINING A LIKELIHOOD OF COMPLETION OF A TASK

BACKGROUND

A user may have interest in creating one or more tasks and the user may utilize one or more applications to create the tasks. For example, a user may have interest in purchasing a product and a task may be created that includes information related to purchasing the product.

SUMMARY

The present disclosure is generally directed to methods and apparatus to determine completion of a task of a user. A likelihood that the task is completed may be determined based on comparison of received user activity data of the user with one or more activity data indicators related to the task. The activity data indicators are indicative of the user performing an action to complete the task through interaction with one or more task completion entities related to the task.

Some implementations utilize one or more determined likelihoods that tasks are completed by a user to determine preferences of the user, and/or a group of users, in completing one or more tasks. For example, in some implementations determined completions of tasks may be utilized to rank members of a collection of task actions and/or members of a collection of task objects. For example, a collection of task actions of "contact" may include the actions of "e-mail", "call", "text", and so forth. The determined completions of a user may be utilized to determine that for tasks associated with a collection of task actions of "contact", the user most strongly prefers the task action of "text". Also, for example, a collection of task objects of "grocery stores" may include the member objects of "Store 1", "Store 2", and "Store 3". The determined completions of a user may be utilized to determine that for tasks associated with a collection of task objects of "grocery store", the user most strongly prefers the task object of "Store 1".

In some implementations a computer implemented method may be provided that includes the steps of: accessing a task entry of a user, the task entry including at least one task action identifier identifying an action to perform to complete a task, and at least one task object identifier identifying an entity associated with the task action; determining, based on the task object identifier, one or more task completion entities with which the user can interact to complete the task; determining, for a given entity of the one or more task completion entities, one or more activity data indicators indicative of the user performing the action through interaction with the given entity; receiving user activity data, the user activity data indicative of one or more of a user action and at least one location of a computing device of the user; comparing the user activity data with the activity data indicators to determine one or more matching activity data indicators of the activity data indicators that match the user activity data; and determining a likelihood that the task is completed based on the matching activity data indicators.

This method and other implementations of technology disclosed herein may each optionally include one or more of the following features.

In some implementations determining the likelihood that the task is completed may include determining the task is completed when the likelihood satisfies a threshold. In some implementations the likelihood may be based on how many of the matching activity data indicators are determined. In some implementations the threshold may be a threshold number of the matching activity data indicators. In some implementations the likelihood may be based on scores associated with the matching activity data indicators.

In some implementations the user action may include at least one of a check-in, payment information, a telephone communication, an electronic communication, a search, navigation history, and a locational query.

In some implementations wherein the task object identifier may be an identifier for a particular store, the task may be related to purchase of an item from the particular store, and the one or more task completion entities may include the particular store. In some implementations the activity data indicators may include a geographic location associated with the store, and the user activity that matches the geographic location data may include a location of the computing device within a threshold distance of the geographical location.

In some implementations the method may further include determining, based on the task entry, one or more steps to perform the task, where the given entity may be determined based on the one or more steps. In some implementations the one or more activity data indicators may include data indicators indicative of completion of all of the one or more steps.

In some implementations the one or more activity data indicators may include at least one activity data indicator associated with an anticipated time duration, and the method may further include determining, based on the user activity data, an actual time duration associated with at least some of the user activity data, where comparing the user activity data with the at least one activity data indicator may include comparing the actual time duration to the actual time duration.

In some implementations the at least one task object identifier may be associated with a collection of entities, and the one or more task completion entities may include members of the collection of entities. In some implementations the given entity may be a member of the collection of entities, and the method may further include determining a ranking of the given entity for the collection of entities based on the likelihood that the task is completed. In some implementations the given entity may be a member of the collection of entities, where determining the likelihood that the task is completed may include determining the task is completed, and the method may further include increasing a ranking of the given entity for the collection of entities based on the likelihood that the task is completed.

In some implementations the task action identifier may identify a collection of actions having a plurality of action members and where determining, for the given entity, one or more activity data indicators may further include associating at least a first of the activity data indicators with a first action member of the action members, associating at least a second of the activity data indicators with a second action member of the action members, determining a ranking of the first action member for the collection of actions based on whether the first of the data indicators is one of the matching activity data indicators, and determining a ranking of the second action member for the collection of actions based on whether the second of the data indicators is one of the matching activity data indicators. In some implementations the ranking of the first action member may be for the collection of actions and the given entity and the ranking of the second action member may be for the collection of actions and the given entity.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein may determine one or more task completion entities with which a user can interact to complete a task. Particular implementations of the subject matter described herein may determine one or more activity data indicators indicative of the user performing the task through interaction with the one or more task completion entities. Particular implementations of the subject matter described herein may compare received user activity data with the one or more activity data indicators to determine a likelihood that the task has been completed.

It should be appreciated that all combinations of the foregoing concepts and additional concepts disclosed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 2 is a table illustrating examples of tasks, task completions entities, and activity data indicators.

FIG. 3A is an example user interface that may be provided to the user in response to determining a task has likely been completed.

FIG. 3B is an example user interface illustrating an example utilization of a determined ranking for a task object member of a task object collection.

FIGS. 3C1 and 3C2 are example user interfaces illustrating an example utilization of a determined ranking for a task action member of a task action collection.

DETAILED DESCRIPTION

Technology described herein is useful in determining a likelihood of completion of a task. For each of one or more task completion entities with which a user can interact to complete a task, one or more activity data indicators may be determined. The one or more activity data indicators for a given task completion entity may be indicative of the user performing the task through interaction with the given task completion entity. User activity data may be received that is indicative of one or more of a location of a computing device of the user and user actions via the computing device and/or one or more other computing devises. The received user activity data may be compared with the one or more activity data indicators to determine if the user activity data matches one or more of the activity data indicators. A likelihood that the task is completed is determined based on the matching activity data indicators.

For example, the task may be "make flight reservation online". The one or more activity data indicators may include an identifier for a webpage where a flight reservation may be made, indicators related to an email confirmation of a flight reservation, an indicator for a financial transaction related to a flight reservation, and/or indicators related to a user post that relates to a flight reservation. The user activity data may be based on a user visit to the webpage where the flight reservation may be made and an email of the user that confirms the flight reservation. The user activity data may be compared to the one or more activity data indicators (e.g., the identifier for the webpage and the indicators related to the email confirmation) to determine a likelihood that the task of making a flight reservation online has been completed.

As another example, the task may be identified as "visit the dentist's office". The one or more activity data indicators may include a threshold visit duration at a location associated with the dentist's office, an indicator related to the Wi-Fi network at the dentist's office, and/or an indicator for a financial transaction related to a visit to the dentist's office. The user activity data may be geolocation data indicating that the user is or was at a location associated with the dentist's office for an actual visit duration. Such user activity data may be compared to the one or more activity data indicators (e.g., the threshold visit duration at the location associated with the dentist's office) to determine a likelihood that the task to visit the dentist's office has been completed.

Figure 1:
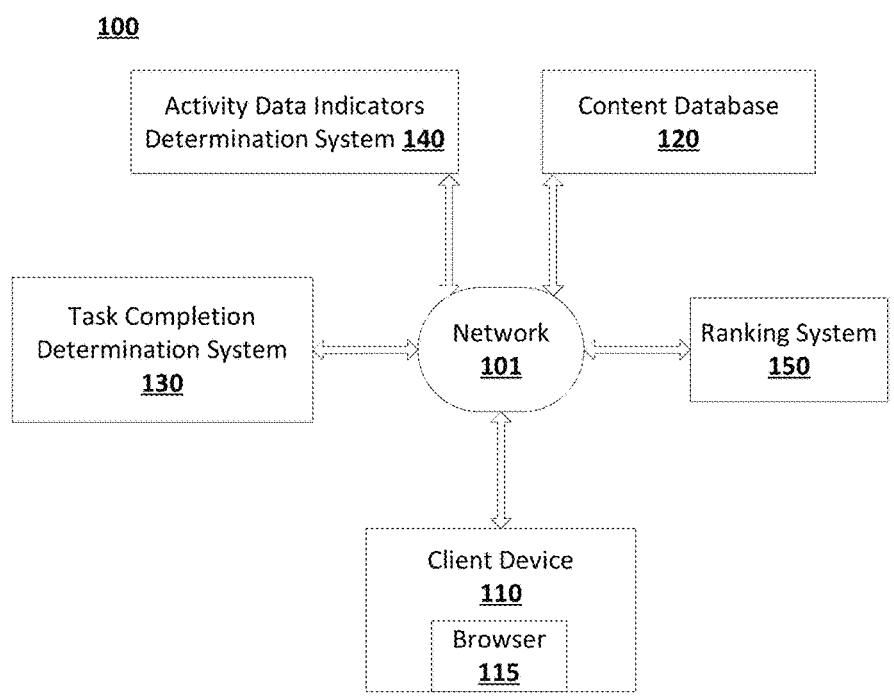
FIG. 1 is a block diagram of an example environment in which completion of a task may be determined.

FIG. 1 illustrates a block diagram of an example environment 100 in which completion of a task may be determined. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques.

The example environment 100 also includes a client device 110, a content database 120, a task completion determination system 130, an activity data indicators determination system 140, and a ranking system 150. The client device 110 may execute one or more applications, such as a web browser 115. The client device 110 may be, for example, a desktop computer, a laptop, a mobile phone, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided. In some implementations the task completion determination system 130, the activity data indicators determination system 140, and/or the ranking system 150 may be combined as a single component.

Generally, a task of a user relates to one or more activities that the user has interest in completing and/or having completed by one or more other users. A task of a user may be associated with the user and may include at least one task action and at least one task object. Each task action of a task identifies an action that the user and/or other user may perform to complete the task. Each task object of a task identifies a non-action entity that is associated with the task action. For example, a task of a user may relate to the activity of buying a television. A task action for that task may be "buy" and the task object may be "television". In some implementations the task may optionally include additional information such as additional task actions, additional task objects, and/or time constraint information related to a time constraint associated with performing the task (e.g., on a certain date, before a certain date, within a window of time).

As described herein, in some implementations one or more task objects of a task may be a task completion entity with which the user can interact to complete the task. For example, a task of a user may be to "buy television at Store A", the task objects may include "television" and "Store A", and the user may interact with "Store A" to complete the task. In some implementations, as described herein, one or more task actions and/or task objects of a task may be utilized to determine one or more task completion entities with which the user can interact to complete the task. For example, a task of a user may be to "buy television", and one or more stores with which the user may interact to complete the task may be determined based on the task action of "buy" and the task object of "television".

One or more tasks of a user may be stored in one or more databases such as content database 120. Any stored tasks of a user may be stored in a manner that prevents access to other users besides the user and/or one or more users authorized by the user. In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

Tasks of a user may be stored as task entries (e.g., in the content database 120) that are associated with the user. Each task entry may identify a task and may include at least one task action identifier identifying a task action of the task and at least one task object identifier identifying a task object of the task. In some implementations, the task action identifier and/or the task object identifier of a task entry may include an entity identifier. An entity identifier may be associated with an entity in one or more databases, such as an entity database. In some implementations, a task action identifier and/or a task object identifier may include a textual representation of the task action and/or task object of the task. For example, a task may include the task action "Buy," and the task action identifier of the task may include an identifier of an entity that is associated with the action "Buy" and/or may include the textual representation "Buy". As described herein, some task entries may have only a single task action identifier and a single task object identifier. Other task entries may have multiple task action identifiers and/or multiple task object identifiers. Moreover, some task action identifiers and/or task object identifiers may identify a particular entity (e.g., a task object may identify a particular store), whereas others may identify a collection of entities (e.g., a task object may identify a group of stores, such as all stores of a certain type and/or in a certain area). In some implementations the task entry may also include additional information related to the task such as, for example, time constraint information.

The task entry of a user may also include a user identifier identifying the user and/or a status identifier indicating whether the task is completed or uncompleted. For example, the status identifier may be a binary identifier with one value indicating the task is completed and the other value indicating the task is uncompleted. Also, for example, the status identifier may be one of three or more values and indicate a likelihood that the task is completed and/or uncompleted. For example, a value of "0" may indicate the task is likely uncompleted, a value of 0.5 may indicate the task is potentially completed, and a value of "1" may indicate the task is likely completed.

The user identifier may be used to directly or indirectly identify the user. For example, the user identifier may be an identifier that associates the task entry with a database that is personal to the user and other information of the database may be utilized to identify the user. Also, for example, the user identification may be a user identification that is associated with a service that manages the task completion determination system 130 and/or that has partnered with a service managing the task completion determination system 130 and may be included with and/or otherwise associated with the task entry of the user.

In some implementations task entries of a user may be determined by the client device 110 and/or by another component in response to information provided by the client device 110. For example, one or more applications executing on the client device 110, such as browser 115, may be utilized to determine a task of a user and/or to directly or indirectly provide information to enable another component to determine the task. For example, the browser 115 or other application of the client device 110 may be utilized by the user to input terms (e.g., typed, spoken) that may be utilized to create a task entry in the content database 120. For example, the user may input "Visit Dentist", which includes the task action identifier "Visit" and the task object identifier "Dentist", and the terms "Visit Dentist" may be stored as a task entry for the user.

As another example, the user may access a mapping service via the client device 110 and issue a directional locational query to the mapping service indicating a desire to receive turn-by-turn directions to the dentist's office. Based on the issued directional locational query, the client device 110 and/or another component may determine a task entry of the user to visit the dentist. The task action of "visit" may be determined based on the issuance of the directional locational query and the task object of "dentist" may be determined based on information of the directional locational query. For example, the address and/or alias utilized in the directional locational query may be mapped to an entity associated with the dentist's office in an entity database and the entity identifier of that entity may be utilized as the task object identifier in the task entry.

As yet another example, the user may submit one or more search queries related to purchasing a television. For example, the user may submit queries such as "television reviews", "television prices", and "stores that sell televisions". Based on the submitted search queries, the client device 110 and/or another component (e.g., a task generation system in communication with the search system that received the queries) may determine a task entry of the user related to purchasing a television. For example, the task entry may include a task action identifier of "purchase" based on a relationship between the action of purchasing and one or more of the submitted queries. Also, for example, the task entry may include tasks objects of "television" and "stores" based on a relationship between those task object and the submitted queries.

As yet another example, the browser 115 or other application of the client device 110 may be utilized by the user to provide the terms "buy fruit" to a task determination system. The task determination system may create a task entry for the user that includes the task action of "buy" and the task object of "fruit" based on the provided terms. The task determination system may further include identifiers for the task action of "visit" and the task objects of "grocery store" and "farmers' market" in the task entry. For example, the task determination system may determine that the input "buy fruit" is mapped to the completion steps of "traveling to the grocery store" and "traveling to the farmers' market" in one or more databases. Based on association of the task with the completion steps, identifiers for the task action of "visit" and the task objects of "grocery store" and "farmers' market" may be included in the task entry. Additional and/or alternative components and/or techniques may be utilized to determine a task entry of the user.

Determining Activity Data Indicators

The activity data indicators determination system 140 may access a task entry of the user. For example, the activity data indicators determination system 140 may access the task entry of the user from the content database 120. The activity data indicators determination system 140 utilizes information of the task entry to determine one or more activity data indicators for the task entry of the user. Each activity data indicator is indicative of the user potentially performing the task of the task entry. The determined activity data indicators may be stored with the task entry and/or otherwise associated with the task entry. For example, identifiers of the activity data indicators may be stored as additional information of the task entry in the content database 120. In some implementations the activity data indicators determination system 140 may only determine one or more activity data indicators for the task entry of the user if an optional status identifier for the task entry indicates the task is uncompleted.

In some implementations, the activity data indicators determination system 140 determines, based on the task entry, one or more task completion entities with which the user can interact to complete the task. The activity data indicators determination system 140 may determine the one or more of the activity data indicators for the task entry based on the determined task completion entities. In some implementations, determining the task completion entities may include determining the task completion entities directly from the task entry. For example, the task entry related to a task to "purchase a television at Store 1" may include a task object identifier for "Store 1" and a task object identifier for "television". The entity associated with "Store 1" may be determined to be a task completion entity with which the user can interact to complete the task and the entity associated with "television" may be determined to be a task completion entity with which the user can interact to complete the task.

Based on the determined one or more task completion entities, the activity data indicators determination system 140 may determine activity data indicators associated with each of the entities. For example, activity data indicators may be determined for the "Store 1" entity based on, for example, one or more properties of the "Store 1" entity. For example, activity data indicators for the "Store 1" entity may include one or more of, a name or alias of the entity (e.g., "Store 1"), an address of the entity (e.g., a street address, a lat/long address), one or more e-mail addresses associated with the entity (e.g., an e-mail address from which purchase confirmations are sent), a network identification (e.g., an IP address and/or SSID) associated with a wireless network at Store 1, one or more webpages and/or websites associated with Store 1, and so forth. The activity data indicators determination system 140 may also determine activity data indicators associated with the "television" entity based on, for example, one or more properties of the "television" entity. For example, activity data indicators for the "television" entity may include one or more of, a name or alias of the entity (e.g., "TV", "television"), one or more webpages and/or websites associated with televisions (e.g., review webpages, manufacturer webpages, and so forth).

In some implementations the activity data indicators determination system 140 may determine the one or more activity data indicators based on entity properties identified from a database such as an entity database. In some implementations the entity database may include a database of structured data, such as a knowledge graph, that includes nodes that represent entities and identifies the type of each entity represented by a node. A node representing an entity may also be associated with metadata in the database of structured data (e.g., via links that represent properties of the entity). Any included metadata may include, for example, names/aliases for the entity, resources related to the entity, descriptive information about the entity, among other data. In some implementations the associated properties of the entity database may be utilized as activity data indicators. The one or more activity data indicators may be determined based on the entity by retrieving the properties associated with the entity from the entity database. In some implementations the properties may be explicitly indicated as activity data indicators in the entity database. In some implementations, entities are persons, places, concepts, and/or things that can be referred to by a textual representation (e.g., a term or phrase) and are distinguishable from one another (e.g., based on context). For example, a unique identifier for the entity associated with the airport with an airport code "LAX" may be associated with a name or alias property of "LAX," another alias property of "Los Angeles International Airport" (an alternative name by which LAX is often referenced), a phone number property, an address property, and/or an entity type property of "airport" in the entity database. Additional and/or alternative properties may be associated with an entity in one or more databases.

In some implementations, the activity data indicators determination system 140 may determine the activity data indicators for a task entry based on one or more of the task action identifiers. For example, the task entry of a user may include a task action identifier associated with "calling" and a task object associated with "Business 1" that is associated with the task action identifier. Accordingly, the task entry indicates a task of the user to "call Business 1". The activity data indicators determination system 140 may determine the activity data indicators for the task entry based on both the task action identifier associated with "calling" and the task object identifier associated with "Business 1". For example, one or more properties for "Store 1" may be determined that are also mapped to the action of "calling". For example, the entity associated with "Store 1" may be identified in an entity database and a property of the "Store 1" entity may be a phone number of "555-555-5555". The phone number of "555-555-5555" may be mapped to an entity associated with "phone numbers" which, in turn, may be mapped to an entity associated with the action of "calling". Based on the phone number of "555-555-5555" being mapped to the entity associated with "Store 1" and the entity associated with the action of "calling", it may be selected as a task action identifier for the task entry.

In some implementations, where a task entry includes multiple task action identifiers, the activity data indicators determination system 140 may utilize the multiple task action identifiers to determine the activity data indicators and/or may associate each of one or more determined activity data indicators with a respective one or more of the task action identifiers. For example, the task entry of a user may include a task action identifier associated with "calling", a task action identifier associated with "emailing", and a task object identifier associated with "Business 1" that is associated with both of the task action identifiers. Accordingly, the task entry indicates a task of the user to either call or email "Business 1". A phone number associated with "Business 1" may be determined (e.g., as described above) as an activity data indicator and the phone number associated with the task action of "calling". Also, an e-mail address associated with "Business 1" may be determined (e.g., in a similar manner as the phone number) as an activity data indicator and associated with the task action of "emailing".

In some implementations, where a task entry includes a task action identifier that identifies a collection of actions, the activity data indicators determination system 140 may determine a plurality of task action members of the collection. The activity data indicators determination system 140 may utilize the multiple task action members to determine the activity data indicators and/or may associate each of one or more determined activity data indicators with a respective one or more of the task action members. For example, the task entry of a user may include a task action identifier associated with "contact" and a task object associated with "Business 1" that is associated with the task action identifier. Accordingly, the task entry indicates a task of the user to "contact Business 1", but does not specify the form of contact. The activity data indicators determination system 140 may determine a plurality of members of the collection of actions indicated by "contact" such as "e-mail", "call", "text", "contact via a webpage", "contact via a social networking platform", "snail mail", etc. In some implementations the activity data indicators determination system 140 may determine the plurality of members of a collection based on a mapping of those members to the collection in an entity database.

The activity data indicators determination system 140 may then: determine a phone number associated with "Business 1" (e.g., as described above) as an activity data indicator and associate the phone number with the task action of "calling", determine an e-mail address associated with "Business 1" as an activity data indicator and associate the e-mail address with the task action of "emailing", and similarly determine activity data indicators of the other members of the collection of actions indicated by "contact" and associate the activity data indicators with respective of the members.

In some implementations, determining the task completion entities may include determining the task completion entities based on the task entry, but not directly from the task entry. For example, the task entry related to a task to "buy tomatoes at grocery" may include a task object identifier for "grocery", which indicates a collection of task objects of "grocery stores", but does not identify any particular grocery stores. The activity data indicators determination system 140 may determine one or more particular grocery stores as task completion entities based on, for example, one or more grocery stores associated with the user and/or one or more grocery stores that are located near the user. For example, the activity data indicators determination system 140 may determine, based on a database that includes grocery stores and associated properties of the grocery stores (e.g., an entity database), those grocery stores that have an associated property indicating they are within a threshold distance of a location associated with the user associated with the task entry. Also, for example, the activity data indicators determination system 140 may determine those grocery stores that may be associated with the user. For example, data associated with the user may indicate that the user has explicitly indicated one or more preferred grocery stores, has visited one or more grocery stores in the past, has a phone number or other contact information for one or more grocery stores in a contact list, has visited web-based documents associated with one or more grocery stores, etc. All or aspects of such data may be utilized to select one or more grocery stores as task completion entities. For example, only those grocery stores that the user has explicitly indicated are preferred grocery stores may be selected.

As another example, the task entry related to a task to "purchase a television" may include a task object identifier for "television", but not identify any stores from which the television may be purchased. The activity data indicators determination system 140 may determine that the task of the task entry may be completed at a group of one or more stores. For example, the activity data indicators determination system 140 may determine a task completion step mapped to the task to "purchase a television" is "purchase the television from online retailer or local brick and mortar retailer". The activity data indicators determination system 140 may then determine, based on the task completion step, one or more task completion entities that are online retailers who sell televisions or local brick and mortar retailers that sell televisions. For example, a database of brick and mortar retailers and associated properties of the brick and mortar retailers may be accessed. The activity data indicators determination system 140 may determine, based on the database, one or more brick and mortar retailers that have an associated property indicating they sell televisions (e.g., an "electronics retailer" property, a "television retailer" property) and that are local to the user associated with the task entry (e.g., based on determining if an address of the retailer is within a threshold distance of a location of the user).

In some implementations one or more determined activity data indicators may be associated with a weighting or score that is indicative of likelihood that the activity data indicator indicates completion of a task through interaction with the task completion entity. In some of those implementations, the weighting of an activity data indicator may be based on the strength of association between the activity data indicator and the task completion entity from which the activity data indicator was determined. For example, when activity data indicators for a given entity are determined based on properties of that entity in an entity database, the mappings between the properties and the entity may be associated with a weighting, with each weighting indicative of strength of association between a property and the entity. For example, the "Store 1" entity may have a strong association to the address of the entity, but a weaker association to a website of a third party that discusses the Store 1 entity.

Additionally and/or alternatively, in some implementations where a preference of a user is utilized to determine one or more task completion entities, the weighting or score of activity data indicators may be based on the user preferences related to their associated task completion entities and/or task actions. For example, a weighting of a task completion indicator associated with a more preferred task completion entity may be more indicative of likelihood that the activity data indicator indicates completion of a task through interaction with the task completion entity than the weighting of a task completion indicator associated with a less preferred task completion entity. For example, as described herein, past determined task completions of a user may be utilized to rank certain task completion entities and/or task actions. The ranking of a given task completion entity and/or task action with which an activity data indicator is associated may be utilized to influence the weighting or score of the activity data indicator. Weightings based on additional and/or alternative factors may be utilized.

In some implementations one or more determined activity data indicators may be associated with, or possibly include, one or more applications a user may utilize to generate user activity data related to the activity data indicators. For example, applications may include a "telephone application," an "email client," a "video chat application," a "social networking platform," and/or a "text application." For example, for the task "Purchase airline tickets," the one or more activity data indicators may include utilization of an application on a mobile phone or tablet that is specifically directed toward making travel reservations (e.g., an application of a travel service). Also for example, for the task "Purchase airline tickets," an e-mail address associated with airline ticket confirmation e-mails from a travel website may be an activity data indicator and may be associated with an "email client" or other application through which a user may receive e-mails.

As another example, for the task "contact mom," the one or more activity data indicators may include an e-mail address for "mom". The activity data indicators determination system 140 may determine the e-mail address, for example, based on a contacts database of the user that includes contact information for "mom". The activity data indicators determination system 140 may associate the e-mail address activity data indicator with an e-mail application and/or with certain aspects of an e-mail application such as a "To" entry in an e-mail application. For example, the activity data indicators determination system 140 may access a mapping that associates e-mail addresses, generally, with e-mail applications and/or aspects of e-mail applications and associate the activity data indicator based on such a mapping. Also, for example, the one or more activity data indicators may include an identifier for "mom's" telephone number. The activity data indicators determination system 140 may associate the telephone number with a phone dialing application and/or a text messaging application.

In some implementations, where an activity data indicator is associated with multiple task actions, one or more applications may be associated with the activity data indicator for the task action. For example, for the task action of "contact mom", activity data indicator determination system 140 may determine a phone number that is associated with the task action of "calling" and associated with the task action of "texting". The activity data indicator determination system 140 may associate a phone dialing application with the telephone number and the task action of "calling" and may associate a text messaging application with the telephone number and the task action of "texting". Also, for example, for the task action of "contact mom", activity data indicator determination system 140 may determine an e-mail address that is associated with the task action of "emailing" and may associate an e-mail application with the e-mail address and the task action of "e-mailing". As described herein, the associated applications may optionally be utilized by the task completion determination system 130 to determine which activity data indicators may match received user activity data and/or by ranking system 150 to determine which action member of a collection of task actions was utilized to complete a task.

Determining Task Completions

The task completion determination system 130 receives user activity data of a user and compares the received user activity data to one or more activity data indicators of a task entry of the user to determine a likelihood that the task associated with the task entry has been completed by the user.

The user activity data may be indicative of one or more of at least one location of a computing device of the user (e.g., client device 110 and/or other computing device) and at least one user action. For example, the user activity data may include data related to a post by the user on a social networking platform, a document visited by the user, an application used by the user, a locational query issued by the user, a location check-in by the user, an email communication to or from the user, and so forth. For example, a confirmation e-mail may be sent to the user in response to the user purchasing an item on-line or in a brick and mortar store. Data related to the e-mail may be user activity data and is indicative of the user action of purchasing the item. Also, for example, a webpage may be visited by the user and data related to the webpage (e.g., a URL or other document identifier of the webpage, content of the webpage) may be user activity data and is indicative of the user action of visiting the webpage. Also, for example, an application may be utilized by the user and data related to the utilization of the application may be user activity data and is indicative of the user action of utilizing the application. Also, for example, a user may travel to a Business with client device 110 and data related to the location of the client device 110 may be utilized as user activity data.

Documents include webpages, word processing documents, portable document format (PDF) documents, images, video, audio, e-mails, calendar entries, task entries, and feed sources, to name just a few. The documents may include content such as, for example: words, phrases, pictures, audio, task identifiers, entity identifiers, etc.; embedded information (such as meta information and/or hyperlinks); and/or embedded instructions (such as JavaScript scripts).

The term "check-in", as used herein, includes a user-approved and/or user-initiated indication of a visit to a location. For example, the user may utilize an application of the computing device to indicate presence at a business the user is visiting (e.g., by selection of a "check-in" option in the application while at the business, by scanning a QR code via the application at the business, by selecting the business from a list of nearby businesses). Also, for example, the user may post a comment on a social networking platform that indicates presence at a location. For example, the user may post a comment stating: "dreading the root canal" and the posted comment may be associated with location information indicting the user is at the dentist (e.g., the comment may indicate the user is "@ Dentist Office X"). As referred to herein, a "selection" of an option, a document, etc. may include, for example a mouse-click, a click-through, a voice-based selection, a selection by a user's finger on a presence-sensitive input mechanism (e.g., a touch-screen device), and/or any other appropriate selection mechanism.

As another example of user activity data, the user may use a mobile phone to dial a telephone number and data related to the telephone number may be user activity data and is indicative of the user action of dialing the telephone number via the mobile phone. As another example, the user may use a computing device to prepare an e-mail and data related to the e-mail (e.g., an e-mail address in the "To:" field) may be user activity data and is indicative of the user action of preparing the e-mail. As another example, the user may use a mobile phone to send a text message and data related to the text message (e.g., a phone number of the recipient) may be user activity data and is indicative of the user action of sending the text message. As another example, a financial transaction confirmation may be posted to an account associated with the user in response to the user purchasing an item from a particular business and data related to the financial transaction confirmation (e.g., an alias of the business) may be user activity data and is indicative of the user action of purchasing the item. As another example, the user may complete navigational steps in response to a directional locational query for turn-by-turn directions to a grocery store. Data related to the completion of the navigation steps and/or the directional locational query may be user activity data and are indicative of user actions.

In some implementations, some or all user activity data may be received by the task completion determination system 130 directly from the client device 110 of the user and/or other computing device of the user. In some implementations, some or all user activity data may be received by the task completion determination system 130 via the content database 120 and/or other database that contains user activity data. For example, in some implementations user activity data may be periodically provided to the task completion system 130 via a database to enable the task completion system to determine if the user activity data indicates a completion or potential completion of one or more tasks of the user. Any stored user activity data of a user may be stored in a manner that prevents access to other users besides the user and/or one or more users authorized by the user.

In situations in which the systems disclosed herein collect personal information about users, or may make use of personal information, the users may be provided with an opportunity to control whether programs or features collect user information (e.g., information about a user's social network, email communications, browsing history, social actions or activities, a user's preferences, or a user's current geographic location), or to control whether and/or how such information is utilized.

As described, the task completion determination system 130 compares received user activity data to one or more activity data indicators of a task entry of the user to determine a likelihood that the task associated with the task entry has been completed by the user. For example, the task completion determination system 130 may compare the received user activity data to one or more activity data indicators of a task entry of the user and determine which activity data indicators, if any, match the received user activity data. The task completion determination system 130 may determine the likelihood the task is completed based on a quantity of matching activity data indicators and/or an optional weighting or score associated with the matching activity data indicators. In implementations where multiple task completion entities are associated with a given task, the likelihood the task is completed may be based on the quantity of matching activity data indicators associated with a given completion entity of the task completion entities.

In some implementations the determined likelihood may be binary. For example, the task completion determination system 130 may determine a likelihood that either indicates the task is completed or the task is uncompleted. In some implementations the determined likelihood may be non-binary. For example, the task completion determination system 130 may determine a likelihood that is a value between 0 and 1, with lower values indicating less likelihood of completion and higher values indicating higher likelihood of completion. In some implementations, the task completion determination system 130 may determine the task is completed if the likelihood satisfies a threshold. In some implementations, the likelihood is based on the number of the activity data indicators that match the received user activity data and the threshold is a threshold number of matching activity data indictors. For example, if all of the activity data indicators match the received user activity data the task completion determination system 130 may determine the task is completed.

For example, for the task "Purchase airline tickets," activity data indicators may include an activity data indicator related to a document identifier of a website from which the airline tickets may be purchased and an activity data indicator related to the format of confirmation e-mails sent from the website in response to purchase of the airline tickets (e.g., "From" e-mail address, keywords in the title, keywords in the body). The task completion determination system 130 may receive user activity data that indicates the user visited the website from which the airline tickets may be purchased and that indicates the user received an e-mail that conforms to the format of confirmation e-mails sent from the website. The task completion determination system 130 may compare the received user activity data and the activity data indicators to determine the received user activity data matches the activity data indicator related to a document identifier of a website from which the airline tickets may be purchased and the activity data indicator related to the format of confirmation e-mails sent from the website in response to purchase of the airline tickets. Based on the matching between the received user activity data and the activity data indicators of the task "Purchase airline tickets", the task completion determination system 130 may determine that the task has been completed.

The term "match" as used herein, includes exact matching and/or soft matching. For example, the task completion determination system 130 may match n-grams of activity data indicators and user activity data by stemming one or more terms of the n-grams, rearranging terms of the n-grams, etc. Also, for example, the task completion determination system 130 may determine a location of an activity data indicator and a location of user activity data match if they are within a threshold distance of one another.

In some implementations, whether activity indicator data is determined to match user activity data may be based on a time duration associated with the user activity data. For example, user activity data that indicates presence of a user at a location may include duration information related to the duration of the visit. In some implementations the user activity data that indicates presence of a user at a location may only be determined to match a related activity data indicator if the duration information satisfies a threshold (e.g., 5 minutes). In some implementations the activity data indicators may include, or be associated with a visit duration that must be achieved to determine a match. For example, a location activity data indicator for a coffee shop may be associated with a visit duration of greater than one minute, whereas a location activity data indicator for a grocery store may be associated with a visit duration of greater than five minutes. Also, for example, a web-based document activity data indicator (e.g., indicating a URL of a webpage) may be associated with a visit duration of greater than twenty seconds. Also, for example, a telephone call activity data indicator (e.g., a phone number) may be associated with a call duration of greater than thirty seconds.

In some implementations the likelihood that a task is completed may be based on a quantity of the one or more activity data indicators (of the task entry as a whole or of a given task completion entity of the task entry) that match the user activity data. For example, two matching activity data indicators may be more indicative of a likelihood the task is completed than just one matching activity data indicator. In some implementations the likelihood may be based on a quantity of the one or more activity data indicators (of the task entry as a whole or of a given task completion entity of the task entry) that match the user activity data, as compared to the total number of activity data indicators (of the task entry as a whole or of a given task completion entity of the task entry). For example, two matching activity data indicators out of five total may be more indicative of a likelihood the task is completed than two matching activity data indicators out of ten total.

In some implementations determining the likelihood may include determining the task is completed if the user activity data matches at least a threshold number of the one or more activity data indicators (of the task entry as a whole or of a given task completion entity of the task entry). In some implementations the threshold number of the one or more activity data indicators may be based on a total number of the activity data indicators of the task entry as a whole or of a given task completion entity of the task entry). For example, for the task "call mom" of a user, the only activity data indicator may be a phone number associated with mom such as "555-555-5555" and if the one activity data indicator matches the received user activity data, the task may be determined to be completed. For example, if received user activity data includes data indicating the user called "555-555-5555", the task may be determined to be completed.

In some implementations the likelihood may additionally be based on any weighting optionally associated with the matching activity data indicators. For example, as described herein, some activity data indicators may be associated with a weighting or score that is indicative of likelihood that the activity data indicator indicates completion of a task through interaction with the task completion entity. For example, in some implementations a higher score may be more indicative of completion of a task through interaction with the task completion entity than a lower score. Accordingly, a first activity data indicator that is associated with a greater score than a second matching activity data indicator may influence the likelihood more strongly than the second matching activity data indicator. For example, if the first activity data indicator is the only matching activity data indicator, completion of a task may be determined; whereas if the second activity data indicator is the only matching activity data indicator, completion of a task may not be determined.

In some implementations the likelihood may additionally be based on any weighting optionally associated with the user activity data that matches activity data indicators. For example, some user activity data may be associated with a weighting or score that is indicative of likelihood that the user activity data indicator indicates completion of a task through interaction with the task completion entity. For example, in some implementations user activity data that is based on a measured location of a user (e.g., GPS based data) may be associated with a greater weighting than user activity data that is based on a search query of a user. Also, for example, in some implementations user activity data that is based on a document viewed by a user may be associated with a greater weighting than user activity data that is based on a search query issued by a user.

In some implementations the likelihood may additionally be based on the degree of the matching between the matching activity data indicators and the user activity data. For example, exact matches may be weighted more heavily than "soft" matches. Also, for example, "soft" matches may be weighted based on how far away from an exact match they are. In some implementations the likelihood may additionally be based on the time duration associated with the user activity data matching the activity data indicators. For example, user activity data that indicates presence of a user at a location for fifty minutes may be weighted more heavily than user activity data that indicates presence of a user at a location for only two minutes. One or more techniques described herein to determine the likelihood that the task is completed may be optionally combined. For example, a linear combination of the one or more techniques described herein may be utilized to determine the likelihood.

The task completion determination system 130 may associate the determined likelihood with the task entry of the user. For example, the task completion determination system 130 may update a status identifier of the task entry to reflect the determined likelihood and/or to reflect that the task has been completed.

In some implementations, if the determined likelihood indicates the task has been completed, the task completion determination system 130 and/or other component may remove the task as an active task of the user. In some implementations, if the determined likelihood indicates the task has potentially been completed, the task completion determination system 130 and/or other component may notify the user that the task has been completed. For example, the task may be flagged as "completed" to notify the user of the determined completion; the user may be presented with a pop-up display indicating the task has been completed; and/or the user may be presented with a display to enable the user to confirm that the task has been completed. In some implementations the type of notification provided to the user, or whether a notification is provided to the user, may depend on the determined likelihood. For example, based on a strong likelihood that the task has been completed, the user may not be notified prior to marking the task as completed. However, based on a weaker likelihood that the task has been completed, the user may first be prompted to ensure the user would like to mark the task as completed.

Ranking Members of a Collection of Task Actions or Task Objects

As described herein, activity data indicators may be associated with a particular task completion entity that is a member of a collection of task objects and/or a task action member that is a member of a collection of task actions. In some implementations, the ranking system 150 may rank members of a collection of task actions and/or members of a collection of task objects based on which activity data indicators match received user activity data of a task that is determined to be completed (as indicated by the determined likelihood and/or further user confirmation). The ranking may be specific to the user for which the task completion is determined, or may be determined for a group of users (e.g., based on determined completions from the user and additional users of the group of users).

For example, a collection of task actions of "contact" may include the actions of "e-mail", "call", "text", and so forth. The ranking system 150 may utilize determined completions of a user to determine that for tasks associated with a collection of task actions of "contact", the activity data indicators that matched the received user activity data are most often those associated with the action of "call". Also, for example, a collection of task objects of "grocery stores" may include "Store 1", "Store 2", and "Store 3". The ranking system 150 may utilize determined completions of a user to determine that for tasks associated with a collection of task objects of "grocery stores", the activity data indicators that matched the received user activity data are most often those associated the task completion entity of "Store 1".

For example, a task entry of "contact mom" includes a task action "contact" that identifies a collection of actions with multiple action members such as "e-mail", "call", "text", "contact via a webpage", "contact via a social networking platform", "snail mail", etc. As described herein, each of one or more of the determined activity data indicators for the task entry may be associated with a respective one or more of the action members. The ranking system 150 may adjust the ranking of one or more of the action members for the collection based on the activity data indicators that match the user activity data. For example, if the matching activity data indicators are all associated with the task action member "e-mail", the ranking of the task action member "e-mail" in the collection of actions "contact" may be improved.

As another example, a task entry of "go to the grocery store" includes a task object "grocery store" that identifies a collection of task objects with multiple task object members such as "Store 1" and "Store 2". As described herein, the task object members may be utilized as the determined task completion entities, and each of the task completion entities may be associated with one or more determined activity data indicators. The ranking system 150 may adjust the ranking of one or more of the task completion entities for the collection based on the activity data indicators that match the user activity data. For example, if the matching activity data indicators are all associated with the task completion entity "Store 1", the ranking of the task completion entity "Store 1" in the collection of task objects "grocery store" may be improved.

In some implementations the determined ranking of a task action member may be a ranking of the task action member for the task action collection, and for one or more task objects (collection or member). For example, the task entry "contact business 1", includes a task action "contact" that identifies a collection of actions with multiple action members such as "e-mail", "call", "text", "contact via a webpage", "contact via a social networking platform", "snail mail", etc. The task entry also includes the task object "business 1". As described herein, each of one or more of the determined activity data indicators for the task entry may be associated with a respective one or more of the action members and the ranking system 150 may adjust the ranking of one or more of the action members for the collection based on the activity data indicators that match the user activity data. The ranking may be of one or more of the action members for the collection and for the task object of "business 1" and/or for a collection of which "business 1" is a member (e.g., a "businesses" collection, a type collection that denotes the business type of "business 1"). For example, if the matching activity data indicators are all associated with the task action member "e-mail", the ranking of the task action member "e-mail" in the collection of actions "contact" for the task object "business 1" may be improved. Accordingly, the ranking of the task action member "e-mail" in the collection of actions "contact" may be improved for tasks of the user that include a task object "business 1", but not necessarily for tasks of the user that do not include a task object "business 1".

In some implementations the determined ranking of a task object member may be a ranking of the task object member for the task object collection, and for a task action (collection or member) and/or another task object. For example, the task entry "purchase electronics at store", includes a task object "store" that identifies a collection of task objects with multiple task object members such as "Store 1" and "Store 2". The task entry also includes the task object "electronics". The ranking system 150 may adjust the ranking of one or more of the task completion entities for the collection based on the activity data indicators that match the user activity data. For example, if the matching activity data indicators are all associated with the task completion entity "Store 1", the ranking of the task completion entity "Store 1" in the collection of task objects "grocery store" for the additional task object "electronics" may be improved. Accordingly, the ranking of the task object member "Store 1" in the collection of task objects "store" may be improved for tasks of the user that include a task object "electronics" (or a member of an "electronics" collection), but not necessarily for tasks of the user that do not include a task object "electronics".

In some implementations the determined ranking for a task object member may be a ranking for the task object member for the task object collection, and for a task action (collection or member). For example, for the task action type "purchase ticket," based on the activity data indicators that match the user activity data, the task completion determination system 130 may determine "airline reservation system" as the utilized entity. The ranking system 150 may determine an entity ranking of the utilized entity for the entity collection for the user as "physical airline reservation system" followed by "online airline reservation system." As another example, for the task action type "contact family," based on the activity data indicators that match the user activity data, the task completion determination system 130 may determine "mom" as the utilized entity. The ranking system 150 may determine an entity ranking of the utilized entity for the entity collection for the user as "grandma's home," followed by "mom's work." Also, for example, for the task action type "purchase groceries," based on the activity data indicators that match the user activity data, the task completion determination system 130 may determine "grocery delivery service" as the utilized entity. The ranking system 150 may determine an entity ranking of the utilized entity for the entity collection for the user as "grocery delivery service that may be called," followed by "physical grocery store."

A determined ranking of a member of a collection may be utilized by one or more components. For example, a task generation system may utilize a determined ranking of a member of a collection to associate a highly ranked member of a collection with a submitted task of a user that identifies the collection. Also, for example, a system may utilize a determined ranking of a member of a collection to recommend a highly ranked member of a collection over other members of the collection in response to a submission of the user of a task or other input that identifies the collection. Some examples of utilization of a determined ranking of a member of a collection are described herein in conjunction with FIGS. 3B, 3C1, and 3C2.

In some implementations the determined ranking may be utilized to determine and/or rank search results for a user. For example, the user may enter a task to "Buy Groceries" and, based on the determined ranking for the collection, "Store 1" may be identified as a preferred task completion entity associated with the user. Search results may be determined and/or ranked based on "Store 1". For example, the ranking of search results associated with "Store 1" may be improved. In some implementations the determined ranking may be utilized to determine and/or rank advertisements for the user. For example, ads may be determined and/or ranked for a query in a similar manner as described with respect to search results.

The content database 120, the task completion determination system 130, the activity data indicators determination system, and/or the ranking system 150 may be implemented in hardware, firmware, and/or software running on hardware. For example, one or more of the systems may be implemented in one or more computer servers. Many other configurations are possible having more or fewer components than the environment shown in FIG. 1. For example, in some environments the ranking system 150 may be omitted.

EXAMPLES

Referring to FIG. 2, a table illustrates one example of task entries, task completion entities, and activity data indicators. Reference is made to FIG. 2 in providing some examples of comparing received user activity data to one or more activity data indicators of a task entry of the user to determine a likelihood that the task associated with the task entry has been completed by the user. The first column of FIG. 2 lists a first task entry and a second task entry of a user. The first task entry relates to a task to "contact mom" and includes a task action identifier of "contact" and a task object identifier of "mom". The second task entry relates to a task to "get groceries" and includes a task action identifier of "get" and a task object identifier of "groceries".

The task completion entity associated with the first task entry is "mom". The task completion entities associated with the second task entry include "Brick and Mortar Grocery Store 1" and "Grocery Delivery Service #1". The activity data indicators determination system 140 may determine the task completion entities as described herein. For example, the activity data indicators determination system 140 may determine "mom" based on the task object identifier of the first task entry and data related to the user such as a contacts database of the user. Also, for example, the activity data indicators determination system 140 may determine "Brick and Mortar Grocery Store 1" and "Grocery Delivery Service #1" based on determining a task completion step mapped to the task to "get groceries" is "purchase the groceries from a grocery retailer". The activity data indicators determination system 140 may then determine, based on the task completion step, one or more task completion entities that are grocery retailers and that are local to the user associated with the task entry (e.g., based on information in a database).

Activity data indicators associated with "mom" include: two phone numbers associated with mom: "555-555-5555" and "444-444-4444"; an e-mail address associated with mom: "mom@example.com"; and information related to mom's social network identification. As described herein, one or more of the activity data indicators may optionally be determined based on, and/or associated with, one or more task action members of a collection of task actions. For example, "contact" identifies a collection of task actions that includes, for example, the task action members of "call", "text", "e-mail", and "contact via social network". The telephone number "555-555-5555" may be associated with the task action members call and text (e.g., based on being identified as a mobile number in the user's contacts database). The telephone number "444-444-4444" may be associated with the task action member call (e.g., based on being identified as a land line). The e-mail address "mom@example.com" may be associated with the task action member e-mail and the information related to mom's social network identification may be associated with the task action "contact via social network".

As described herein, one or more of the activity data indicators and/or task actions may optionally be associated with, one or more applications a user may utilize to generate user activity data related to the activity data indicators. For example, the telephone number "444-444-4444" may be associated with a phone application. Also, as described herein, one or more of the activity data indicators may optionally be associated with a weighting or score that is indicative of likelihood that the activity data indicator indicates completion of a task through interaction with the task completion entity. For example, each of the activity data indicators for the task completion entity "mom" may be associated with a score that indicates the task is completed if user activity data matching the activity data indicator is received.

Activity data indicators associated with "Brick and Mortar Grocery Store #1" include: location information (e.g., an address, a lat/long coordinate, and/or a geographic area); aliases associated with the Store; Application Information (e.g., an application associated with the Store such as one that may be utilized to view flyers, view promotions, and/or load coupons); web-based documents (e.g., document identifiers for one or more webpages associated with the store); and wireless network information (e.g., a network ID, an IP address). Activity data indicators associated with "Grocery Delivery Service #1" include: aliases associated with the Store; Application Information (e.g., an application associated with the service such as one that may be utilized to order groceries); web-based documents (e.g., document identifiers for one or more webpages associated with the service); and e-mail confirmation information (e.g., key terms, subject line, and/or sender e-mail associated with confirmation e-mails from the service).

As described herein, one or more of the activity data indicators may optionally be associated with, one or more applications a user may utilize to generate user activity data related to the activity data indicators. For example, the web-based documents may be associated with a web browser application, the aliases may be associated with a web browser application and a search application, and the application information may be associated with a corresponding application. Also, as described herein, one or more of the activity data indicators may optionally be associated with a weighting or score that is indicative of likelihood that the activity data indicator indicates completion of a task through interaction with the task completion entity. For example, the activity data indicators of "location information" and "wireless network" information for the task completion entity "Brick and Mortar Grocery Store #1" may be each be associated with a score that indicates the task is completed if user activity data matching the activity data indicator is received. However, the activity data indicators of "aliases", "location information", and "web-based documents" for the task completion entity "Brick and Mortar Grocery Store #1" may each be associated with a score that, standing alone, indicates the task is potentially completed, if user activity data matching the activity data indicator is received.

The task completion determination system 130 may receive user activity data of a user and compare the received user activity data to tasks of the user such as the tasks represented by the task entries of FIG. 2. For example, the task completion determination system 130 may receive user activity data that indicates the user dialed the phone number "555-555-5555" via a phone dialing application. The task completion determination system 130 may compare the received user activity data to the activity data indicator of "555-555-5555", determine they match, and determine a likelihood that the task has been completed. For example, the task completion determination system 130 may determine a likelihood that indicates that the task to "contact mom" has been completed and update the task entry associated with the task to reflect that the task has been completed.

In some implementations, the ranking system 150 may improve the ranking of the task action of "calling" for the collection of task actions "contact" based on the determined likelihood that the task has been completed based on the matching activity data indicator of "555-555-5555". As described, the activity data indicator of "555-555-5555" may be associated with the task action members of "calling" and "texting". The received user activity data matches the activity data indicator of "555-555-5555" and indicates the activity data indicator of "555-555-5555" was "called" by the user. In some implementations it may be determined that the activity data indicator of "555-555-5555" was called by the user by comparing an application associated with the received user activity data (e.g., a phone dialing application) to the application that is optionally associated with the activity data indicator of "555-555-5555" and the member action of calling (e.g., a phone dialing application). Accordingly, the ranking system 150 may improve the ranking of "calling" for the collection of task actions "contact". The ranking may be specific to the user for which the task completion is determined, or may be determined for a group of users. In some implementations, the ranking system 150 may improve the ranking of "calling" for the collection of task actions "contact" and the task object of "mom" and/or for a collection of task objects of which "mom" is a member (e.g., "family", "contacts of the user", "people").

The task completion determination system 130 may further receive user activity data that indicates the user submitted a search query of "Store #1 Location" via a search engine. The task completion determination system 130 may compare the received user activity data to the activity data indicator of "aliases" for the task completion entity "Brick and Mortar Grocery Store #1" and determine the terms "Store #1" match an alias indicated by the "aliases" activity data indictor such as an alias of "Store #1". Based on the match between the received user activity data and the activity data indicator of "aliases" for the task completion entity "Brick and Mortar Grocery Store #1, the task completion determination system 130 may determine a likelihood that indicates that the task to "get groceries" has potentially been completed. For example, the task completion determination system 130 may determine a likelihood based on a score associated with the activity data indicator and the likelihood may indicate a relatively weak likelihood that the task has been completed. In some implementations, the task completion determination system 130 may update the task entry associated with the task to reflect that the task may have been completed and/or prompt the user to determine whether the task has been completed.

The task completion determination system 130 may receive additional user activity data that indicates the user visited a web-based document X and was near a location to enable a computing device of the user to sense wireless network Y. The task completion determination system 130 may compare the additional received user activity data to the activity data indicators of "web-based documents" and "wireless network information" for the task completion entity "Brick and Mortar Grocery Store #1" and determine the web-based document X matches a web-based document indicated by the "web-based document" activity data indictor and the wireless network Y matches a wireless network indicated by the "wireless network information" activity data indicator. Based on these two matches, and the previously determined match to the activity data indicator of "aliases" for the task completion entity "Brick and Mortar Grocery Store #1, the task completion determination system 130 may determine a likelihood that indicates that the task to "get groceries" has been completed. For example, the task completion determination system 130 may determine a likelihood based on scores associated with all three of the matching activity data indicators (e.g., a sum, weighted average) and the likelihood may indicate a very strong likelihood that the task has been completed. In some implementations, the task completion determination system 130 may update the task entry associated with the task to reflect that the task has been completed and/or prompt the user to determine whether the task has been completed.

In some implementations, the ranking system 150 may improve the ranking of the task object of "Brick and Mortar Grocery Store #1" for the collection of task actions "grocery stores" based on the determined likelihood that the task has been completed based on the matching activity data indicators corresponding to "Brick and Mortar Grocery Store #1". As described, the activity data indicators may be associated with the task completion entity. Accordingly, the ranking system 150 may improve the ranking of "Brick and Mortar Grocery Store #1" for the collection of task objects "grocery store". The ranking may be specific to the user for which the task completion is determined, or may be determined for a group of users.

FIG. 3A is an example user interface that may be provided to the user in response to determining a task has likely been completed. The user interface includes a window 360A that indicates that provides an indication to the user that it appears a task of the user has been completed ("It appears you have completed your task to 'contact mom'") and provides an indication of how the completion of the task was determined ("based on the e-mail you just sent"). The window 360A also queries the user as to whether the user would like to mark the task as completed and provides a selectable "Yes, task completed" interface element 362A and a selectable "No, task not completed" interface element 364A. In response to selection of interface element 362A, the task completion determination system 130 may mark the user task to "contact mom" as completed. For example, it may be marked as completed in a task list of the user, removed from a task list of the user, and/or moved to a completed task list. In response to selection of interface element 364A, the task completion determination system 130 may mark the user task to "contact mom" as not completed and optionally wait for additional user activity data that may further indicate potential completion of the task.

In some implementations, the task completion determination system 130 may provide the window 360A, or other user interface, in response to determining a task has likely been completed. In some implementations, the task completion determination system 130 may provide the window 360A, or other user interface, if a determined likelihood that the task is completed satisfies a threshold indicating "likely" completion. In some implementations, the task completion determination system 130 may provide the window 360A, or other user interface, if a determined likelihood that the task is completed satisfies a threshold indicating "likely" completion, but fails to satisfy a threshold indicating "very likely" completion. In some implementations when a determined likelihood that the task is completed satisfies a threshold indicating "very likely" completion, the task completion determination system 130 may mark the task as completed without prompting the user to verify the task has been completed via the window 360A or other user interface.

FIG. 3B is an example user interface illustrating an example utilization of a determined ranking for a task object member of a task object collection. In FIG. 3B the user has entered the task "Go to the Grocery" in input 366B and selected the submit task interface element 367B. The activity data indicators determination system 140 and/or other component (e.g., a task generation system) may, as described herein, determine "grocery stores" as a collection of task objects associated with the task and further determine one or more members of the collection. The activity data indicators determination system 140 and/or other component may utilize a ranking of the members for the collection, as determined by ranking system 150, to determine that "Store #1" is the most highly ranked member of the collection for the user.

Based on determining that "Store #1" is the most highly ranked member of the collection, the activity data indicators determination system 140 and/or other component provides a window 360B that provides an indication to the user that "Store #1" is the most highly ranked member of that collection for the user ("In the past, you've used "Store #1" to complete similar tasks"). The window 360B also queries the user as to whether the user would like to associate the task "Go to the Grocery" with "Store #1" and provides a selectable "Yes, associate with Store #1" interface element 362B and a selectable "No, do not associate with Store #1" interface element 364B. In response to selection of interface element 362B, the activity data indicators determination system 140 and/or other component may associate the user task to with "Store #1". For example, only activity data indicators associated with "Store #1" may be determined for the task. Also, for example, "Store #1" may be added to a task entry associated with the task, completion steps for the task may be tailored to "Store #1", etc. In response to selection of interface element 364B, activity data indicators determination system 140 and/or other component may not associate the task with "Store #1" and may optionally query the user as to whether another store should be associated with the task (e.g., presenting a list of additional members of the collection that is optionally ordered based on a determined ranking).

In some implementations, a list of members of the collection that is ordered based on the ranking of the members of the collection for the user may be provided in lieu of a single most highly ranked member. In some implementations, one or more of the most highly ranked members of the collection for the user may be associated with the task without first prompting the user. For example, only activity data indicators associated with the five most highly ranked members may be determined for the task.

FIGS. 3C1 and 3C2 are example user interfaces illustrating an example utilization of a determined ranking for a task action member of a task action collection. In FIG. 3C1 the user has entered the task "Contact Mom @ 5:00" in input 366C and selected the submit task interface element 367C. The activity data indicators determination system 140 and/or other component (e.g., a task generation system) may, as described herein, determine "contact" is a collection of task actions and further determine one or more task action members of the collection. The activity data indicators determination system 140 and/or other component may utilize a ranking of the members for the collection, as determined by ranking system 150, to determine that "call" is the most highly ranked member of the collection for the user.

Based on determining that "call" is the most highly ranked member of the collection, the activity data indicators determination system 140 and/or other component provides a window 360C to the user at 5:00. The window 360C includes a selectable "call" interface element 362C that may be selected by the user to call "mom". For example, selecting the interface element 362C will dial mom's phone number in a phone dialing application. The window 360C also includes information identifying the number of "mom" that will be called ("555-555-5555") and an indication that it is mom's number ("MOM"). The phone number may be identified, for example, utilizing techniques described herein with respect to determining activity data indicators based on the task object ("mom") and the task action ("call"). The user interfaces of FIGS. 3A-3C2 are provided as examples only. Additional and/or alternative user interfaces may be provided that utilize one or more aspects of information described herein.

Figure 4:
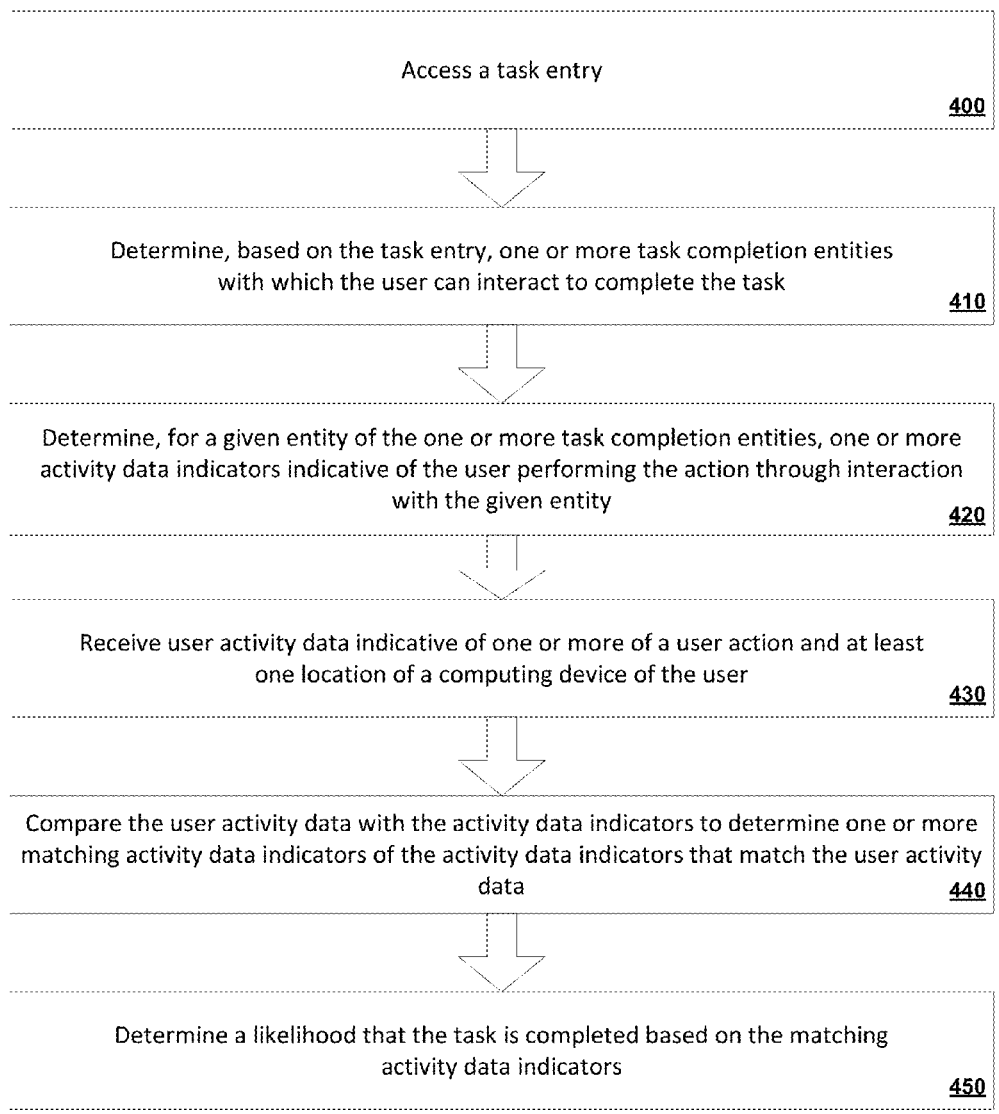
FIG. 4 is a flow chart illustrating an example method of determining a likelihood of completion of a task.

Referring to FIG. 4, a flow chart illustrates an example method of determining a likelihood of completion of a task. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the content database 120, the task completion determination system 130, the activity data indicators determination system, and/or the ranking system 150 of FIG. 1.

At step 400, a task entry may be accessed. For example, the activity data indicators determination system 140 may access the task entry of a user from the content database 120. Each task entry may identify a task and may include at least one task action identifier identifying a task action of the task and at least one task object identifier identifying a task object of the task. For example, a task may include the task action "Buy," and the task action identifier of the task may include an identifier of an entity that is associated with the action "Buy" and/or may include the textual representation "Buy". As described herein, some task entries may have only a single task action identifier and a single task object identifier. Other task entries may have multiple task action identifiers and/or multiple task object identifiers. Moreover, some task action identifiers and/or task object identifiers may identify a particular entity (e.g., a task object may identify a particular store), whereas others may identify a collection of entities (e.g., a task object may identify a group of stores, such as all stores of a certain type and/or in a certain area). In some implementations the task entry may also include additional information related to the task such as, for example, time constraint information.

The task entry of a user may also include a user identifier identifying the user and/or a status identifier indicating whether the task is completed or uncompleted. The user identifier may be used to directly or indirectly identify the user. For example, the user identifier may be an identifier that associates the task entry with a database that is personal to the user and other information of the database may be utilized to identify the user. Also, for example, the user identification may be a user identification that is associated with a service that manages the task completion determination system 130 and/or that has partnered with a service managing the task completion determination system 130 and may be included with and/or otherwise associated with the task entry of the user.

At step 410, one or more task completion entities with which the user can interact to complete the task may be determined. In some implementations, the activity data indicators determination system 140 determines, based on the task entry, one or more task completion entities with which the user can interact to complete the task. The activity data indicators determination system 140 may determine the one or more of the activity data indicators for the task entry based on the determined task completion entities. In some implementations, determining the task completion entities may include determining the task completion entities directly from the task entry. For example, the task entry related to a task to "purchase a television at Store 1" may include a task object identifier for "Store 1" and a task object identifier for "television". The entity associated with "Store 1" may be determined to be a task completion entity with which the user can interact to complete the task and the entity associated with "television" may be determined to be a task completion entity with which the user can interact to complete the task.

At step 420, for a given entity of the one or more task completion entities, one or more activity data indicators may be determined. The one or more activity data indicators may be indicative of the user performing the action through interaction with the given entity. In some implementations, the activity data indicators determination system 140 determines activity data indicators associated with each of the task completion entities. For example, activity data indicators may be determined for the "Store 1" entity based on, for example, one or more properties of the "Store 1" entity. For example, activity data indicators for the "Store 1" entity may include one or more of, a name or alias of the entity (e.g., "Store 1"), an address of the entity (e.g., a street address, a lat/long address), one or more e-mail addresses associated with the entity (e.g., an e-mail address from which purchase confirmations are sent), a network identification (e.g., an IP address and/or SSID) associated with a wireless network at Store 1, one or more webpages and/or websites associated with Store 1, and so forth. As described herein, in some implementations one or more determined activity data indicators may be associated with, and/or determined based on, the task action of the task.

At step 430, user activity data may be received. The user activity data may be indicative of one or more of a user action and at least one location of a computing device of the user. In some implementations one or more determined activity data indicators may be associated with, or possibly include, one or more applications a user may utilize to generate user activity data related to the activity data indicators. For example, applications may include a "telephone application," an "email client," a "video chat application," a "social networking platform," and/or a "text application." For example, for the task "Purchase airline tickets," the one or more activity data indicators may include utilization of an application on a mobile phone or tablet that is specifically directed toward making travel reservations (e.g., an application of a travel service). Also for example, for the task "Purchase airline tickets," an e-mail address associated with airline ticket confirmation e-mails from a travel website may be an activity data indicator and may be associated with an "email client" or other application through which a user may receive e-mails.

At step 440, the user activity data may be compared with the activity data indicators to determine one or more matching activity data indicators of the activity data indicators that match the user activity data. In some implementations the task completion determination system 130 receives user activity data of a user and compares the received user activity data to one or more activity data indicators of a task entry of the user to determine a likelihood that the task associated with the task entry has been completed by the user.

The user activity data may be indicative of one or more of at least one location of a computing device of the user (e.g., client device 110 and/or other computing device) and at least one user action. For example, the user activity data may include data related to a post by the user on a social networking platform, a document visited by the user, an application used by the user, a locational query issued by the user, a location check-in by the user, an email communication to or from the user, and so forth. For example, a confirmation e-mail may be sent to the user in response to the user purchasing an item on-line or in a brick and mortar store. Data related to the e-mail may be user activity data and is indicative of the user action of purchasing the item. Also, for example, a webpage may be visited by the user and data related to the webpage (e.g., a URL or other document identifier of the webpage, content of the webpage) may be user activity data and is indicative of the user action of visiting the webpage. Also, for example, an application may be utilized by the user and data related to the utilization of the application may be user activity data and is indicative of the user action of utilizing the application. Also, for example, a user may travel to a Business with client device 110 and data related to the location of the client device 110 may be utilized as user activity data.

At step 450, based on the matching activity data indicators, a likelihood that the task is completed may be determined. For example, the task completion determination system 130 may compare the received user activity data to one or more activity data indicators of a task entry of the user and determine which activity data indicators, if any, match the received user activity data. The task completion determination system 130 may determine the likelihood the task is completed based on a quantity of matching activity data indicators and/or an optional weighting or score associated with the matching activity data indicators. In implementations where multiple task completion entities are associated with a given task, the likelihood the task is completed may be based on the quantity of matching activity data indicators associated with a given completion entity of the task completion entities.

In some implementations the determined likelihood may be binary. For example, the task completion determination system 130 may determine a likelihood that either indicates the task is completed or the task is uncompleted. In some implementations the determined likelihood may be non-binary. For example, the task completion determination system 130 may determine a likelihood that is a value between 0 and 1, with lower values indicating less likelihood of completion and higher values indicating higher likelihood of completion. In some implementations, the task completion determination system 130 may determine the task is completed if the likelihood satisfies a threshold. In some implementations, the likelihood is based on the number of the activity data indicators that match the received user activity data and the threshold is a threshold number of matching activity data indictors. For example, if all of the activity data indicators match the received user activity data the task completion determination system 130 may determine the task is completed.

For example, for the task "Purchase airline tickets," activity data indicators may include an activity data indicator related to a document identifier of a website from which the airline tickets may be purchased and an activity data indicator related to the format of confirmation e-mails sent from the website in response to purchase of the airline tickets (e.g., "From" e-mail address, keywords in the title, keywords in the body). The task completion determination system 130 may receive user activity data that indicates the user visited the website from which the airline tickets may be purchased and that indicates the user received an e-mail that conforms to the format of confirmation e-mails sent from the website. The task completion determination system 130 may compare the received user activity data and the activity data indicators to determine the received user activity data matches the activity data indicator related to a document identifier of a website from which the airline tickets may be purchased and the activity data indicator related to the format of confirmation e-mails sent from the website in response to purchase of the airline tickets. Based on the matching between the received user activity data and the activity data indicators of the task "Purchase airline tickets", the task completion determination system 130 may determine that the task has been completed.

Figure 5:
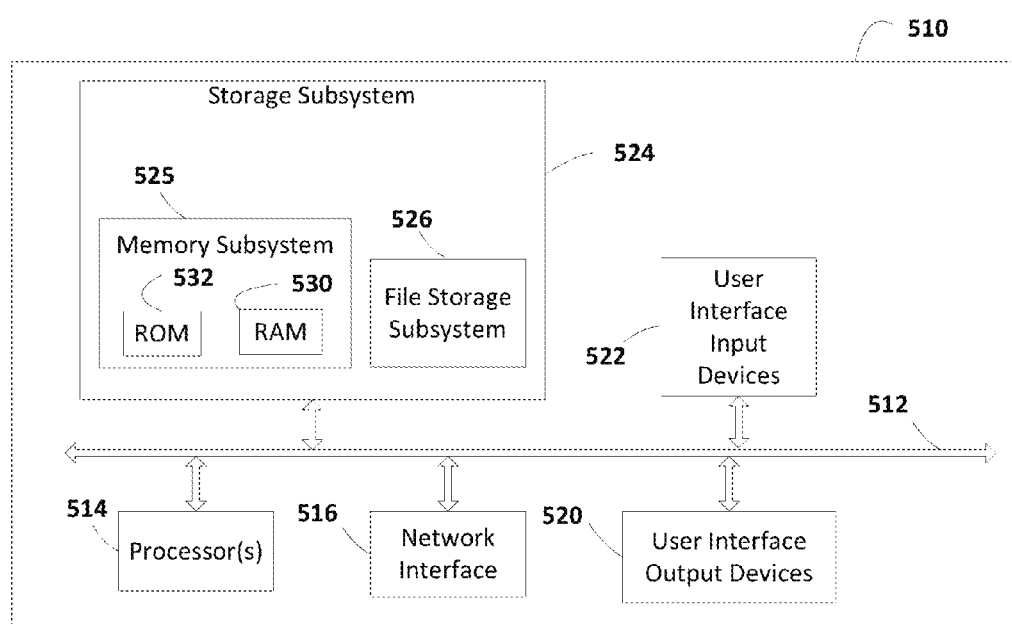
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to determine one or more task completion entities with which a user can interact to complete a task. As another example, the storage subsystem 524 may include the logic to determine one or more activity data indicators indicative of the user performing the task through interaction with the one or more task completion entities. As another example, the storage subsystem 524 may include the logic to compare received user activity data with the one or more activity data indicators to determine a likelihood that the task has been completed.

These software modules are generally executed by processor 514 alone or in combination with other processors. Memory 525 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
 accessing, from one or more databases, a task entry of a user, the task entry including:
  at least one task action identifier identifying an action to perform to complete a task, and at least one task object identifier identifying an entity associated with the task action,
    wherein the task object identifier includes an identifier for a particular store, and
    wherein the task is related to purchase of an item from the particular store;
determining, based on the task object identifier, one or more task completion entities with which the user can interact to complete the task, where the one or more task completion entities include the particular store;
determining, for the particular store, one or more activity data indicators indicative of the user performing the action through interaction with the particular store;
receiving user activity data over one or more networks, the user activity data indicative of one or more of a user action via one or more computing devices of the user and at least one location of one or more of the computing devices of the user;
comparing the user activity data with the activity data indicators to determine one or more matching activity data indicators of the activity data indicators that match the user activity data;
determining a likelihood that the task is completed through interaction with the particular store based on the matching activity data indicators;
adjusting a ranking of the particular store based on the likelihood that the task is completed through interaction with the particular store;
after adjusting the ranking, and in response to user entry of a new task via one of the computing devices of the user:
    determining that the new task includes a collection of task objects that include the particular store and additional stores;
    providing, for presentation to the user via the one of the computing devices, a user interface that includes an identifier of the particular store based on the ranking of the particular store and that includes a selectable interface element;
    in response to selection of the selectable interface element by the user via a user interface input device of the one of the computing devices, associating the particular store with the new task in a new task entry stored in one or more of the databases.

2. The method of claim 1, wherein determining the likelihood that the task is completed includes determining the task is completed when the likelihood satisfies a threshold.

3. The method of claim 2, wherein the likelihood is based on how many of the matching activity data indicators are determined.

4. The method of claim 3, wherein the threshold is a threshold number of the matching activity data indicators.

5. The method of claim 2, wherein the likelihood is based on scores associated with the matching activity data indicators.

6. The method of claim 1, wherein the user action includes at least one of a check-in, a payment information, a telephone communication, an electronic communication, a search, navigation history, and a locational query.

7. The method of claim 1, wherein the activity data indicators include a geographic location associated with the store, and the user activity that matches the geographic location data includes a location of the computing device within a threshold distance of the geographic location.

8. The method of claim 1, further comprising determining, based on the task entry, one or more steps to perform the task, wherein the particular store is determined based on the one or more steps.

9. The method of claim 8, wherein the one or more activity data indicators include data indicators indicative of completion of all of the one or more steps.

10. The method of claim 1, wherein the one or more activity data indicators include at least one activity data indicator associated with an anticipated time duration, and further including:
    determining, based on the user activity data, an actual time duration associated with at least some of the user activity data;
    wherein comparing the user activity data with the at least one activity data indicator includes comparing the anticipated time duration to the actual time duration.

11. The method of claim 1, wherein the at least one task object identifier is associated with a collection of entities, and the one or more task completion entities include members of the collection of entities.

12. The method of claim 11, wherein determining the likelihood that the task is completed includes determining the task is completed through interaction with the particular store, and wherein adjusting the ranking of the particular store comprises:
    increasing the ranking of the particular store for the collection of task objects based on the likelihood that the task is completed.

13. The method of claim 1, wherein the task action identifier identifies a collection of actions having a plurality of action members and wherein determining, for the particular store, one or more activity data indicators includes:
    associating at least a first of the activity data indicators with a first action member of the action members;
    associating at least a second of the activity data indicators with a second action member of the action members;
    determining a ranking of the first action member for the collection of actions based on whether the first of the data indicators is one of the matching activity data indicators; and
    determining a ranking of the second action member for the collection of actions based on whether the second of the data indicators is one of the matching activity data indicators.

14. The method of claim 13, wherein the ranking of the first action member is for the collection of actions and the particular store and the ranking of the second action member is for the collection of actions and the particular store.

15. A system including memory and one or more processors operable to execute instructions stored in memory, comprising instructions to:
    access a task entry of a user from one or more databases, the task entry including:
        at least one task action identifier identifying a collection of actions to perform to complete a task, the collection of actions having a plurality of action members, and
        at least one task object identifier identifying an entity associated with the task action;
    determine, based on the task object identifier, one or more task completion entities with which the user can interact to complete the task;
    determine, for a given entity of the one or more task completion entities, one or more activity data indicators indicative of the user performing the action through interaction with the given entity, wherein the instructions to determine, for the given entity, one or more activity data indicators include instructions to:
  associate at least a first of the activity data indicators with a first action member of the action members;
  associate at least a second of the activity data indicators with a second action member of the action members;
  receive user activity data, the user activity data indicative of one or more of a user action via one or more computing devices of the user, and at least one location of one or more of the computing devices of the user;
  compare the user activity data with the activity data indicators to determine one or more matching activity data indicators of the activity data indicators that match the user activity data;
  determine a ranking of the first action member for the collection of actions based on whether the first of the data indicators is one of the matching activity data indicators;
  determine a ranking of the second action member for the collection of actions based on whether the second of the data indicators is one of the matching activity data indicators;
  in response to user entry of a new task via one of the computing devices of the user:
    determine the new task includes the task action identifier that identifies the collection of actions;
    provide, for presentation to the user via the one of the computing devices, a user interface that includes an identifier of the first action member based on the ranking of the first action member and that includes a selectable interface element;
    in response to selection of the selectable interface element by the user via a user interface input device of the one of the computing devices, associate the first action member with the new task in a new task entry stored in one or more databases.

16. The system of claim 15, wherein the at least one task object identifier is associated with a collection of entities, and the one or more task completion entities include members of the collection of entities.

17. The system of claim 16, wherein the given entity is a member of the collection of entities, and the instructions further include instructions to:
  determine a ranking of the given entity for the collection of entities based on the likelihood that the task is completed.

18. The system of claim 16, wherein the given entity is a member of the collection of entities, wherein the instructions to determine the likelihood that the task is completed include instructions to determine the task is completed, and the instructions further include instructions to:
  increase a ranking of the given entity for the collection of entities based on the likelihood that the task is completed.

19. A non-transitory computer readable storage medium storing instructions executable by a processor, the instructions including instructions to:
  access, from one or more databases, a task entry of a user, the task entry including:
    at least one task action identifier identifying an action to perform to complete a task, and
    at least one task object identifier identifying an entity associated with the task action,
    wherein the task object identifier includes an identifier for a particular store, and
    wherein the task is related to purchase of an item from the particular store;
  determine, based on the task object identifier, one or more task completion entities with which the user can interact to complete the task, where the one or more task completion entities include the particular store;
  determine, for the particular store, one or more activity data indicators indicative of the user performing the action through interaction with the particular store;
  receive user activity data over one or more networks, the user activity data indicative of one or more of a user action via one or more computing devices of the user, and at least one location of one or more of the computing devices of the user;
  compare the user activity data with the activity data indicators to determine one or more matching activity data indicators of the activity data indicators that match the user activity data;
  determine a likelihood that the task is completed through interaction with the particular store based on the matching activity data indicators;
  adjust a ranking of the particular store based on the likelihood that the task is completed through interaction with the particular store;
  after adjusting the ranking, and in response to user entry of a new task via one of the computing devices of the user:
    determine that the new task includes a collection of task objects that include the particular store and additional stores;
    provide, for presentation to the user via the one of the computing devices, a user interface that includes an identifier of the particular store based on the ranking of the particular store and that includes a selectable interface element;
    in response to selection of the selectable interface element by the user via a user interface input device of the one of the computing devices, associate the particular store with the new task in a new task entry stored in one or more of the databases.

* * * * *